Patented May 24, 1949

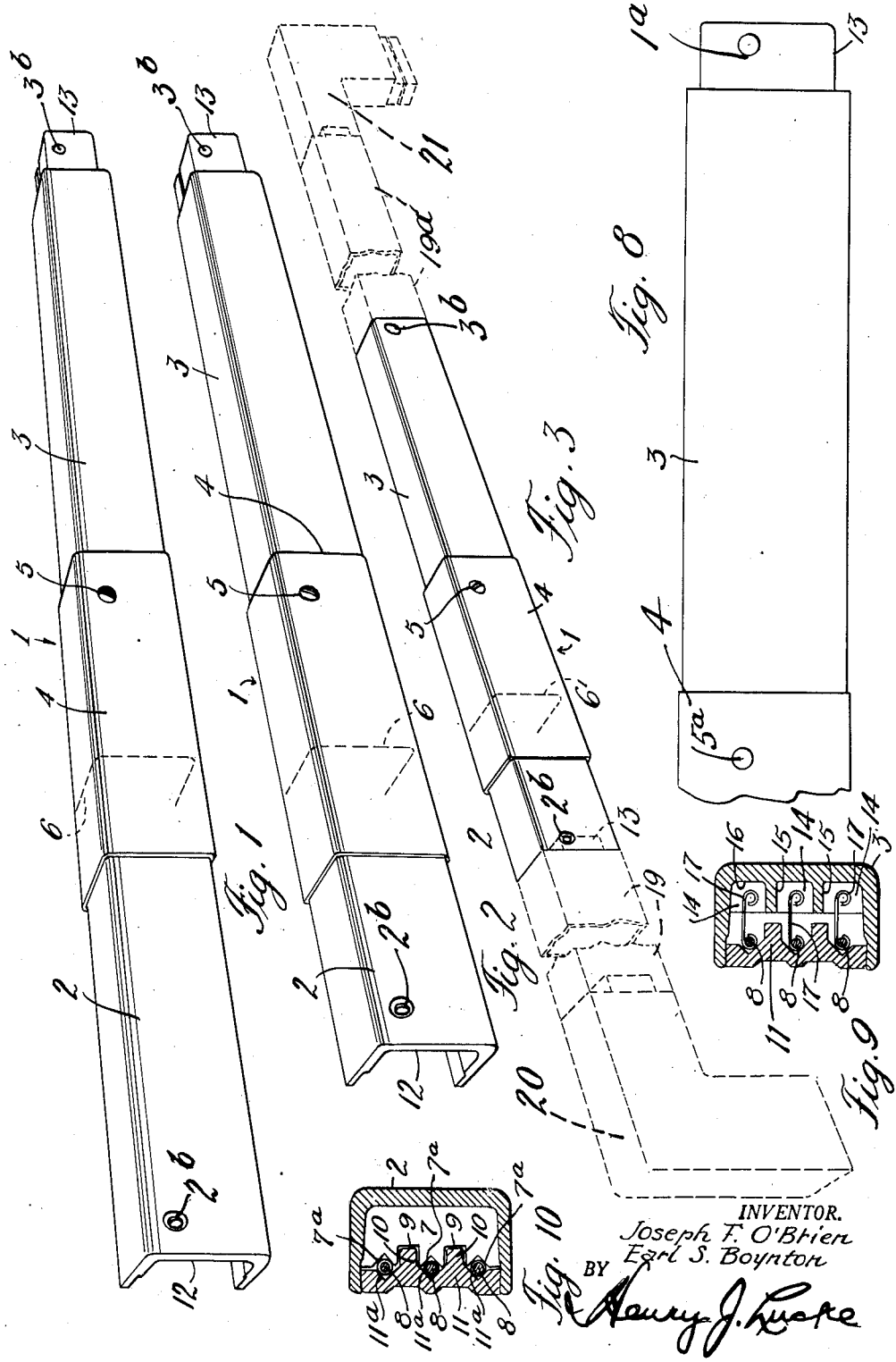

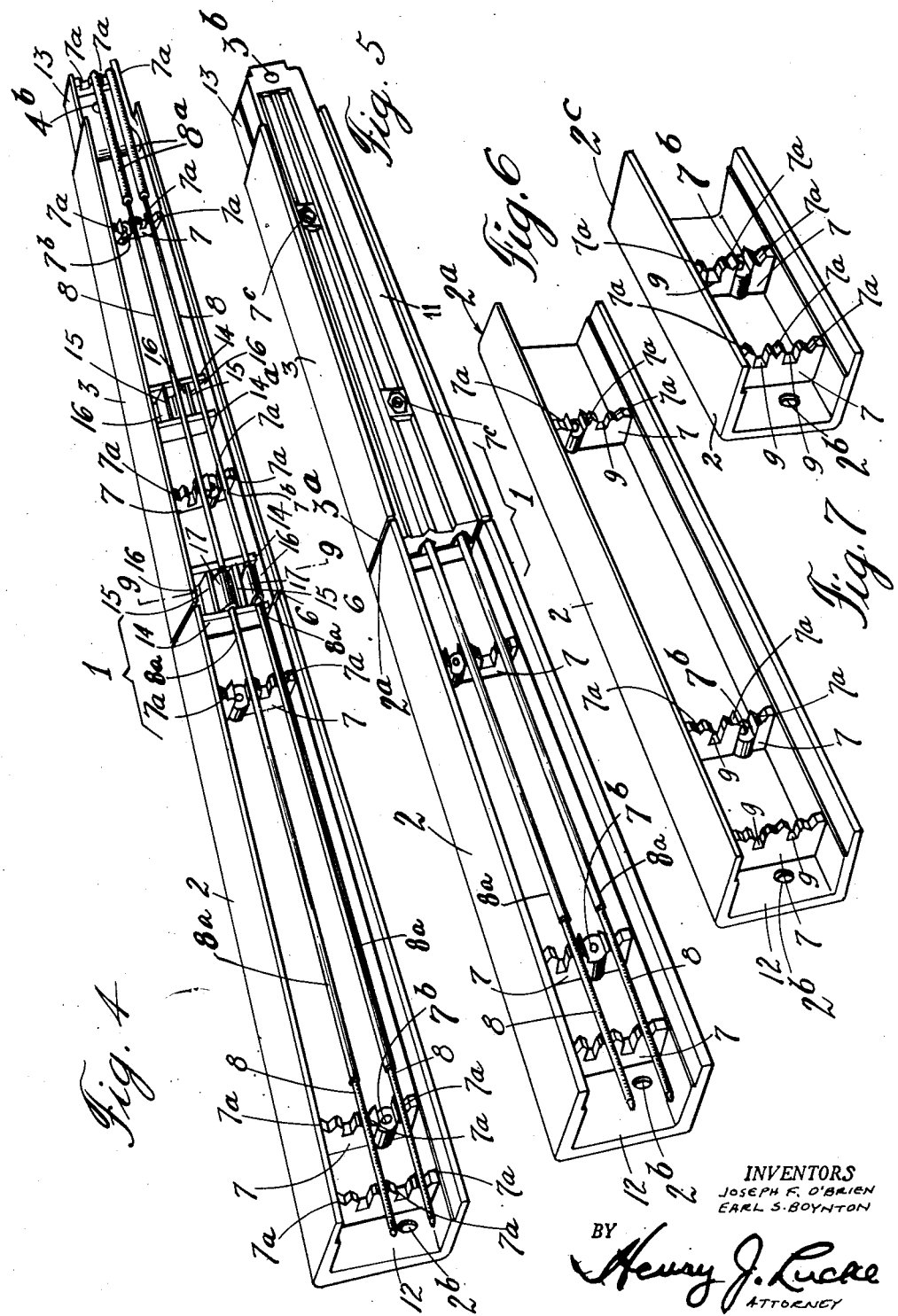

2,470,788

UNITED STATES PATENT OFFICE 2,470,788

SEVERABLE ELECTRICAL CONDUIT SECTION

Joseph F. O'Brien, Lebanon, and Earl S. Boynton, East Orange, N. J., assignors to John B. Pierce Foundation, New York, N. Y., a corporation of New York Application December 7, 1944, Serial No. 567,054

7 Claims. (Cl. 174—99)

The present invention relates to electrical conduit sections of reduced length.

Pursuant to present commercial practice sections of electrical conduit systems are supplied in standard lengths. Thus for conduit systems constructed for installation in conventional buildings, particularly residential and like houses, conveniently attached to a wall, the standard length corresponds to the spacing between the centers of studding, usually sixteen inches. For installation in industrial plants, the sections of applicable electrical conduit systems are of a greater standard length, commonly of forty-eight inches.

Such electrical conduit sections of standard length, pursuant to present commercial practice, embody essentially a rectilinear housing or conduit of electrical insulating material, the plastic presently sold to the trade by the Carbide & Carbon Corp. of New York city, under the trademark "Bakelite" being a preferred material, in which housing the two or more electrical conductors are appropriately mounted in proper spacing from one another. To achieve simplicity of installation and adequacy of mechanical and electrical interconnections of such sections by seriatim assembly, the sections are provided with a male formation at one end and a female formation at the opposite end, affording thereby a telescopic joint at contiguous ends of immediately adjacent sections. In such systems the ends of the electrical conductors of any given section project beyond the body of the housing within the overhang of the female end and are received within sleeves or sockets attached to the electrical conductors at the male end of the thereto seriatim connected adjoining section, to effect good electrical connection therewith.

Such standard conduit systems frequently include variant corner sections and other non-rectilinear sections, but these are also of standardized lengths at their respective end portions and their housing and conductor assembly is in general of similar nature as the rectilinear sections.

By reason of the standardization of length of sections of such seriatim connected conduit systems, the problem arises in installations where a section is required of a length less than the standard length, encountered as when approaching a corner of a wall or about the wall of an alcove or the like. The very assembly of the essential parts of such standardized rectilinear and corner sections does not permit them to be severed to a shorter length imposed by the installation requirements to mate with a standard corner section or other non-rectilinear section.

The instant invention resolves this problem by providing a severable section which comprises essentially complementary sub-sections. One sub-section has at one end a male formation and its opposite end is "squared." The complementary sub-section has one end "squared" which is brought into juxtaposed abutting engagement with the "squared" end of the stated sub-section and its opposite end has a female formation. The electrical conductors are appropriately secured in proper spaced relation with such complementary assembly, to afford mechanical and electrical interconnection corresponding in nature to that of seriatim connected rectilinear sections, above referred to.

To insure rectilinear relationship of such complementary sub-sections, a sleeve member is provided which bridges the location of juxtaposed abutment of the "squared" ends of the sub-sections. Screws or like fastening elements pass through registering openings of such sleeve and the therewith telescoped portions of the sub-sections to attain permanency of position. Such securement may serve also for attaching the complementary sub-sections to the wall or other support. Such sleeve functions also preclude access from the exterior to the electrical conductors through the abutting "squared" joint.

For the purpose of simplifying manufacture, such complementary sub-sectional section is supplied to the market of a length less than the standard length of a rectilinear section. To obtain a lesser length the stated assembly of sub-sections is disassembled, and one section, say the sub-section having a female formation, is severed to reduce its length as may be required, the severed portion being measured from its "squared" end, thus maintaining its female end intact. The electrical conductors are each severed for the corresponding length of severing and then replaced in the re-assembled complementary sub-sections, now reduced in overall length, to meet the requirements of the particular conditions.

Further features and advantages of the invention will be apparent from the following detailed description of the specific embodiment illustrated in the accompanying drawings, in which—

Fig. 1 is a perspective view of a preferred embodiment of the invention, as viewed from its frontal faces, such embodiment comprising two sub-sections: the sub-section appearing to the right in this figure has its free end of male formation; the sub-section appearing to the left has its free end of female formation.

Fig. 2 is a similar perspective view, but showing a reduced overall length of the complementary sub-sections, in this instance by reducing the length of the left hand, i. e., the female-ended sub-section.

Fig. 3 is a perspective diagrammatic view of a typical application of installation, requiring a conduit section of reduced length, specifically completing the electrical conduit between two corner sections.

Fig. 4 is a perspective view of the embodiment illustrated in Fig. 1, as viewed from its interior, the telescoping sleeve and base plates of the respective sections having been removed.

Fig. 5 is a perspective view similar to that of Fig. 4, but illustrating the complementary sub-assembly of reduced overall length, corresponding to that of Fig. 2.

Fig. 6 is a perspective view of the female-ended subsection indicated at the left of Fig. 4.

Fig. 7 is a perspective view of the female-ended sub-section after reduction of its length.

Fig. 8 is a detail frontal elevation of the male-ended sub-section and of a portion of the assembly sleeve.

Fig. 9 is a transverse detail section on line 9—9 of Fig. 4, with the base plate in position.

Fig. 10 is a detail transverse sectional view of the female-ended sub-section with its base plate in position.

The preferred embodiment 1, illustrated in the drawings, comprises two rectilinearly alined complementary sub-sections 2, 3, each shown of channel-form cross section held in alinement by a close-fitting sleeve 4, which is slid over the sub-sections and secured in position with respect to the sub-sections, as by means of a screw 5 in this instance passing through the indicated opening 5a in the sleeve and a therewith registering opening in the sub-section 3. If desired, a like screw or equivalent may similarly secure the sleeve 4 with respect to the sub-section 2.

The sub-sections 2, 3, are shown provided with transverse ridges 7, 7, which are grooved at 7a, 7a, at the top edge thereof, to accommodate the conductors 8, 8, of such number as prescribed by the type of electrical system. The ridges 7, 7, are also provided with recesses 9, 9, intermediate the grooves 7a, 7a, the recesses serving to accommodate the longitudinal ridges 10, 10, of the respective closure base plates 11, 11, which latter, in addition, are each provided with longitudinal grooves 11a, 11a, which are arranged to complement the grooves 7a, 7a, in the transverse ridges 7, 7, and thus provide channels through which the conductors 8 pass and between which they are firmly clamped, as most clearly appears in Fig. 10. The base plates 11, 11, are substantially duplicates of one another and are respectively attached to the housings of the sub-sections 2, 3, by screws 7c passing through suitable openings in the base plates 11, 11, and tapped recesses 7b in the transverse ridges 7, or equivalent.

One end of the sub-sections, in the illustrated embodiment, the sub-section 2, is provided with a female formation 12; the other sub-section is provided with a male formation 13. As shown in Figs. 1 and 2, and also in Figs. 4 and 5, the female formation 12 is located at one end of the assembly 1 and the male formation at the opposite end of the assembly. The juxtaposed ends 2a of the sub-section 2 and 3a of the sub-section 3 are each "squared" to make a close fitting abutting joint.

The overall length of the sub-sections 2, 3, as indicated in Figs. 1 and 4, may be as desired, but advantageously it is less than the standard length of a standardized rectilinear section. The electrical conductors 8 each have a length indicated in Fig. 4, extending flush with and from the male end 13 of sub-section 3, to project beyond the body of sub-section 2 within its overhang 12. At the ends of the conductors located within the male formation 13, they are provided with sockets, for the reception and good electrical connection with the projecting ends of conductors of like polarity of the adjoining conduit section in the seriatim system.

Assuming the electrical conductors to be positioned properly within the sub-sections, as above set forth, and the base plates to be secured in position with respect to the sub-sections, the assembly sleeve 4 is then slipped over the sub-sections, to bridge their abutting "squared" ends, thus holding the sub-sections in firm relationship.

The housings of the sub-sections 2, 3, are desirably of insulating material preferably of thermosetting plastic, such as "Bakelite." The assembly sleeve 4 may be of any suitable material. The sleeve may be of metal, utilizing the rigidity of metal of thin dimension, thereby minimizing the visual effect of the thickness of the sleeve added to that of the sub-sections; further, visual concealment of the assembly device is attained by coloring the sleeve in correspondence to that of the sub-sections.

When it is desired or necessary to reduce the overall length of the severable section, the sleeve 4 is slipped off and then the base plate 11 is removed from the female-ended sub-section 2. The housing of the sub-section 2 is then taken, and the extent of reduction in overall length is severed as measured from the "squared" end 2a of the sub-section 2. The line of such severing is "square," i. e. at right angles to the direction of length of sub-section 2. A typical comparative reduction is indicated by the comparative Figs. 6 and 7: Fig. 6 shows the original length of sub-section 2 as embodied in the original assembly illustrated in Fig. 4, and also in Fig. 1; Fig. 7 shows the sub-section 2 after it has been severed, thus giving rise to the newly formed "squared" end 2c of the sub-section 2, as also indicated in Figs. 2 and 5.

The electrical conductors 8, 8, are also reduced in length by corresponding reduction, in this instance by severing from their free ends theretofore enclosed within the sub-section 2 at and adjacent its female end formation.

The severing at the stated end portions of the electrical conductors may be accomplished while their opposite end portions are still in position within the male-end sub-section 3. To afford such convenience of reducing the lengths of the electrical conductors, suitable means are provided for positively positioning the electrical conductors with respect to the sub-section 3. In the preferred embodiment illustrated in the drawings, such positive positioning means are shown in the form of wells 14, and attaching the lugs 17 to the respective conductors. These wells 14 correspond in number to that of the conductors; such wells are molded or otherwise formed within the housing of the sub-section 3. Such wells 14 preferably include mutually spaced walls 15 to provide isolated individual wells 14 for the respective lugs of the electrical conductors. The wells 14 are preferably located at or closely adjacent the "squared" end 3ᵃ of the sub-section 3, advantageous in firmly holding the conductors against longitudinal displacement at the stage of severing the same.

The base plate 11 of the sub-section 2 is severed similarly to the manner of severing the housing of sub-section 2, namely, as measured from its end corresponding to the "squared" end 2ᵃ of the sub-section.

The stage of severing having been completed, the reduced housing of the sub-section 2 and its reduced base plate 11 are now re-assembled with respect to the severed conductors and the sub-section 3, and the sleeve 4 located in position, including affixing the sleeve 4, as by the screw 5.

Fig. 2 indicates the assembled section 1 of overall reduced length, as clearly appears by comparison with Fig. 1, indicating the original overall length. Comparison of reduced overall length attained by the severing is had by comparing the dash line 6 shown in Fig. 2 with the dash line 6 of Fig. 1, the line 6 indicating the butt joint of the respective "squared" ends of the sub-sections 2, 3.

Preferably, as shown in Figs. 4 and 5, the electrical conductors 8 are provided with insulation, indicated at 8a, particularly over their portions, interiorly embraced within the severable sub-section, viz., the sub-section 2 of the embodiment illustrated in the drawings. Such insulation extends at and from plane 6 of the butt joint formed by the "squared" ends 2a, 3a, of the sub-sections, and serves to preclude access to the conductors from the exterior of the housings of the sub-sections, and in the instance of the use of metal for the assembly sleeve 4, to precautionarily insulate the same with respect to the electrical conductors under all conceivable circumstances, such as imperfect severing operation of the housing or base plate of the severed sub-section, presence of water or other liquid in the vicinity of the butt joint, etc. It is apparent, in the circumstance of the severing of the conductors to such an extent as to bring the line of severing to or within their zones of insulation, sufficient insulation is removed from their newly formed ends to provide baring of their ends within the overhang of the female formation 12 of the sub-section 2, to afford proper electrical connection of the conductors with conductors of like polarity at the male end of the adjoining section of the seriatim conduit system.

Fig. 3 illustrates a typical condition of installation requiring overall length. For example, the effective spacing between the corner or angle sections 20, 21, is such that two rectilinear sections 19, 19a, of standard length can be used but leaving an unfilled space of a length less than the standard length of such rectilinear section. The section 1 indicated in Fig. 3 is a severable section as above described and which has been reduced by severing pursuant to the procedure above set out. Assuming that the corner or angle section 20, has been installed by mechanically connecting its indicated end, say its female end, to the male end of the preceding (unshown) section, then the female end of the rectilinear section 19 is similarly connected to the male end of the corner or angle section 20, then the female end 12 of the severed sub-assembly section 1 is connected with the male end of the rectilinear section 19; then the female end of the rectilinear section 19a is similarly connected with the male end 13 of the severed section 1, and, so on, completing the connections of the section 19a with the corner or angle section 21, and thus in seriatim in completion of the electrical conduit system. Such mechanical connections, it is observed, also effect good electrical connections by telescopic relation of the respective ends of the electrical conductors of like polarity of the respective sections, including the conductors of the severed section 1.

The wells 14 and the therewith cooperating lugs 17 of the conductors serve to retain the conductors against longitudinal displacement at the stage of telescopic engagement of the respective conductors when effecting the seriatim assembling of the rectilinear conduit sections with the severed section.

In the illustrated embodiment, the electrical conductors are shown as solid and provided at their ends passing through the male end formation of each section with sleeves 8a, which may be soldered or frictionally or otherwise secured to the respective conductors.

The installation is secured in position upon a wall of building or the like, or to a side of the base of a machine or the like, or to any other suitable support by screws or other suitable fastening means passing through the perforation 2b of the overhang of each female end telescoped over the male end of the adjoining section whereby the perforation 3b of the latter male end is brought into register with the stated perforation 2b.

The invention is also applicable for seriatim or other suitable types of electrical conduit systems employing hollow, i. e., tubular conductors, telescopic connection of the respective ends of conductors of like polarity being afforded the hollow structure per se, of the conductor at one end and by conically reducing its other end to make good frictional engagement within the tubular end of the conductor of the adjoining section.

As shown in Fig. 4, the unseverable sub-section, in this instance the male ended sub-section 3, may be provided with a well formation 14a intermediate its ends of its housing, to receive and firmly hold therein lugs of the general nature of the lugs 17, referred to above, which are secured to the respective conductors 8. Preferably, the location of such intermediate well formation 14a is selected to be beyond the zone of the housing of sub-section 3 covered by the assembly sleeve 4, and the lugs which are attached to the conductors and positioned with the intermediate well 14a, of contact element formation whereby upon providing the housing at the location of the well 14a with outlet apertures in respective alignment with such contact element lugs, there is afforded electrical connection with the prongs of an electrical plug or other contact device, as will be understood by those skilled in the art. Such arrangement affords a severable section which serves also as an outlet-provided section.

As appears from the comparison of Fig. 4 with Figs. 9 and 10, the number of electrical conductors may be as desired. In Fig. 4, as also in Fig. 5, and dependent Figs. 6 and 7, two electrical conductors 8, 8, are illustrated, the conductor-receiving grooves 7a of the ridges 7 and complementary grooves 11a of the closure base plates 11, 11, being of corresponding number and at proper spacing to afford the necessary insulation with respect to the electrical conductors. In Figs. 9 and 10, three electrical conductors 8, 8, 8 are indicated and a corresponding number of conductor-receiving grooves 7a, 7a, 7a provided for in the respective ridges 7, 7, 7, and similar and corresponding grooves 11a, 11a, 11a in the base plates 11, 11.

As is now apparent from the illustrated embodiment and the foregoing description, severable electrical conduit sections pursuant to the invention comprise a plurality of mutually abutting rectilinearly extending sub-sections having housings provided with "squared" ends arranged to be brought into abutting engagement at their "squared" ends, electrical conductors insulatedly disposed within said housings, said electrical conductors extending individually integrally and coextensively within the housings of such sub-sections, the electrical conductors being preferably provided with insulation at the zones of such abutting engagement, and removable means such as screws or the like or in addition sleevelike means for maintaining such sub-sections in rectilinear engagement, thus affording severing at a "squared" end of one of such sub-sections to thereby reduce the overall length of such conduit section, the electrical conductors being severed to a reduced length corresponding to the reduction effected by such severing.

Whereas the invention has been described by reference to specific forms thereof, it will be understood that many changes and modifications may be made provided they do not depart from the scope of the claims.

We claim:

1. A severable rectilinear section of a seriatim connected electrical conduit system, said system being formed of sections mechanically and electrically mutually connected by conforming male and female end formations, said severable section comprising sub-sections having conforming housings provided with "squared" ends arranged to be brought into mutual contiguous engagement at their "squared" ends, one of said sub-sections having a male end formation and another of said sub-sections having a female end formation; electrical conductors insulatedly and removably mounted within said housings, said electrical conductors individually extending integrally coextensively through said plurality of housings; and means for maintaining said housings in rectilinear extension and in contiguous engagement at their stated "squared" ends, whereby the "squared" end of one of said housings may be severed thereby reducing the length of such housing and whereby the ends of said electrical conductors may be severed adjacent the outer end of the severed housing to a common length corresponding to the reduction of length of such housing.

2. A severable rectilinear section of a seriatim connected electrical conduit system as defined by claim 1 in which the electrical conductors are removably held in position within a recess formed in the housing of an unsevered sub-section.

3. A severable rectilinear section of a seriatim connected electrical conduit system as defined by claim 1 in which the sub-sections are two in number.

4. A severable rectilinear section of a seriatim connected electrical conduit system as defined by claim 1 in which the sub-sections are two in number and the electrical conductors are removably held in position within a recess formed in the housing of the unsevered sub-section.

5. A severable rectilinear section of a seriatim connected electrical conduit system as defined by claim 1 in which said rectilinear extension maintaining means is in the form of a sleeve of rigid material closely embracing said housings.

6. A severable rectilinear section of a seriatim connected electrical conduit system as defined by claim 1 in which said rectilinear extension maintaining means is in the form of a sleeve of rigid material closely embracing said housings and screws for securing said housings to a suitable support.

7. A severable rectilinear section of a seriatim connected electrical conduit system as defined by claim 1 in which said rectilinear extension maintaining means comprises screws serving to secure said housings to a suitable support.

JOSEPH F. O'BRIEN.
EARL S. BOYNTON.

REFERENCES CITED

The following references are of record in the file of this patent:

UNITED STATES PATENTS

| Number | Name | Date |
| --- | --- | --- |
| 454,546 | Sperry | June 23, 1891 |
| 1,590,569 | Fisk | June 29, 1926 |
| 1,885,513 | De Mask | Nov. 1, 1932 |
| 2,072,703 | Beersman | Mar. 2, 1937 |
| 2,108,031 | Acuff | Feb. 15, 1938 |
| 2,239,652 | Morten et al. | Apr. 22, 1941 |
| 2,292,395 | O'Brien | Aug. 11, 1942 |